(12) United States Patent
Huang et al.

(10) Patent No.: US 7,966,441 B2
(45) Date of Patent: Jun. 21, 2011

(54) INTERFACING APPARATUS AND METHOD USING A SINGLE PREDETERMINED COMMUNICATION PROTOCOL FOR ACCESSING REMOTE PERIPHERAL DEVICES THAT USE DIFFERENT COMMUNICATION PROTOCOLS

(75) Inventors: Shih-Yuan Huang, Keelung (TW); Shang-Ching Hung, Taoyuan County (TW)

(73) Assignee: Aten International Co., Ltd., Shijr (TW)

( * ) Notice: Subject to any disclaimer, the term of this patent is extended or adjusted under 35 U.S.C. 154(b) by 429 days.

(21) Appl. No.: 12/042,290

(22) Filed: Mar. 4, 2008

(65) Prior Publication Data

US 2009/0228627 A1 Sep. 10, 2009

(51) Int. Cl.
*G06F 13/20* (2006.01)
(52) U.S. Cl. ......... 710/313; 710/314; 710/311; 709/218
(58) Field of Classification Search .......... 710/300–317, 710/62–64, 72, 8–19, 104–110; 709/208–219
See application file for complete search history.

(56) References Cited

U.S. PATENT DOCUMENTS

| | | | |
|---|---|---|---|
| 6,665,731 B1 * | 12/2003 | Kumar et al. | 709/246 |
| 7,069,349 B2 * | 6/2006 | Hawkins et al. | 710/15 |
| 7,228,345 B2 | 6/2007 | Larson et al. | |
| 7,409,482 B2 * | 8/2008 | Olsen et al. | 710/107 |
| 2005/0066106 A1 * | 3/2005 | Lee | 710/316 |
| 2005/0160207 A1 * | 7/2005 | Chen et al. | 710/74 |
| 2007/0226377 A1 * | 9/2007 | Jreij et al. | 710/8 |
| 2009/0138631 A1 * | 5/2009 | Hung | 710/48 |
| 2009/0164684 A1 * | 6/2009 | Atherton et al. | 710/300 |

* cited by examiner

*Primary Examiner* — Raymond N Phan
(74) *Attorney, Agent, or Firm* — Chen Yoshimura LLP (57) ABSTRACT

A server having remote peripheral device access functions for accessing different types of peripheral devices located on a remote host, such as USB, SATA and IDE devices. The remote device access function is implemented in the IPMI section of the server. The IPMI section is connected to a bridge of the server, and communicates with the bridge using a single predetermined communication protocol, such as the PCI protocol, regardless of the type of the peripheral devices being remotely accessed. An application on the remote host communicates with the IPMI section of the server to transmit the data generate by or to be consumed by the peripheral device using a predetermined network protocol.

16 Claims, 5 Drawing Sheets

INTERFACING APPARATUS AND METHOD USING A SINGLE PREDETERMINED COMMUNICATION PROTOCOL FOR ACCESSING REMOTE PERIPHERAL DEVICES THAT USE DIFFERENT COMMUNICATION PROTOCOLS

BACKGROUND OF THE INVENTION

1. Field of the Invention

This invention relates to remote peripheral device access, and in particular, it relates to a method and apparatus for accessing remote peripheral devices that use different communication protocols.

2. Description of the Related Art

Figure 1A:
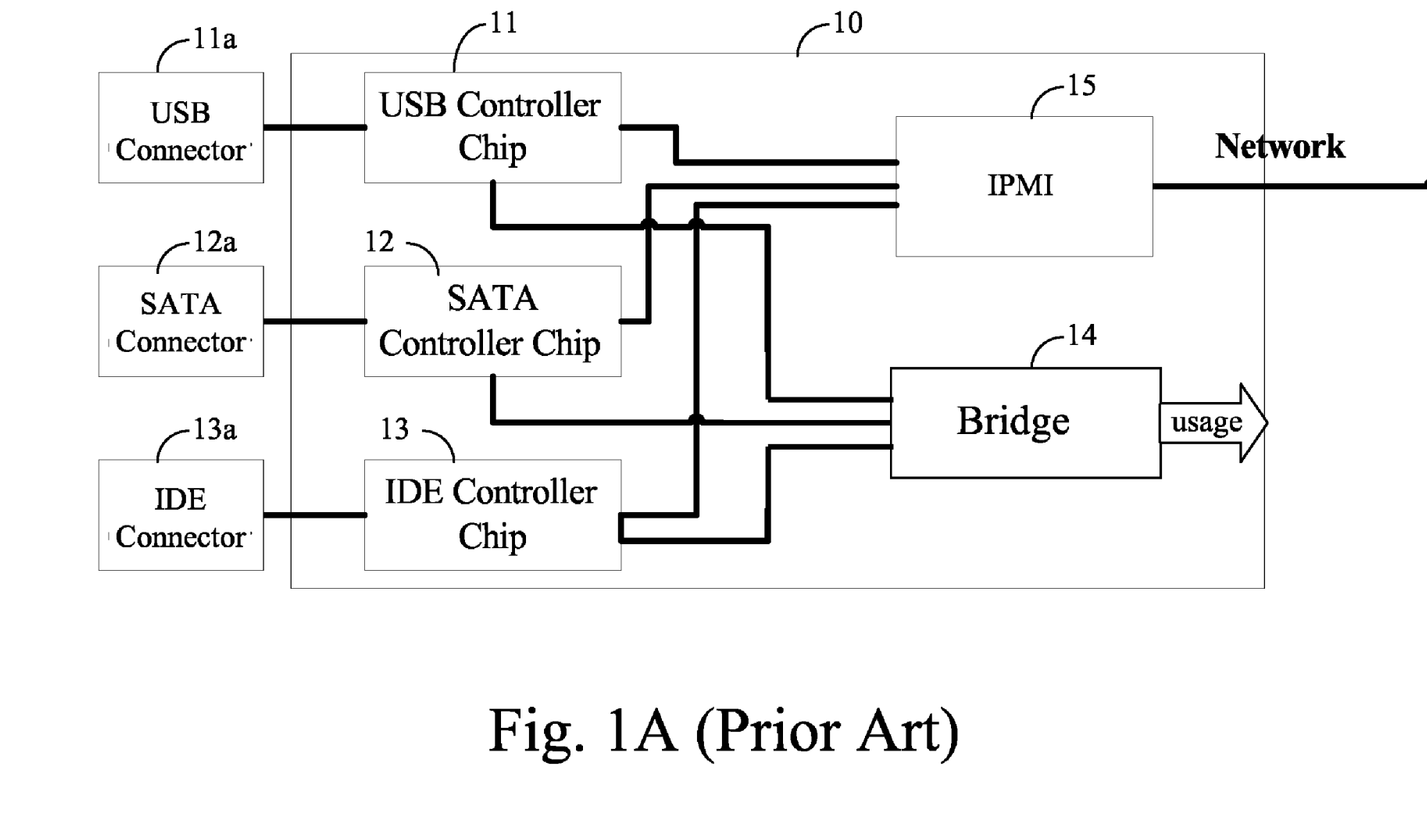
FIG. 1A illustrates a conventional server having remote USB, SATA and IDE access capabilities.

FIG. 1A illustrates a conventional configuration of a server that provides remote USB (Universal Serial Bus), SATA (Serial Advanced Technology Attachment) and IDE (Integrated Drive Electronics) access capabilities. Remote USB (or SATA, IDE) access is a technology that allows a USB (or SATA, IDE) device connected to a USB (or SATA, IDE) port of a remote host (e.g., a client of the server) to be accessed by a local host (e.g., the server) that is connected to the remote host by a network. The USB (or SATA, IDE) device on the client will appear to the server as if it is physically located on the server itself (referred to as virtual devices). In the system shown in FIG. 1A, the server 10 includes a USB controller 11 connected to a USB connector 11a, a SATA controller 12 connected to a SATA connector 12a, an IDE controller 13 connected to an IDE connector 13a, and a bridge 14 connected to the USB controller 11, the SATA controller 12 and the IDE controller 13. The USB, SATA and IDE connectors 11a, 12a and 13a are for receiving external USB, SATA and IDE devices, respectively (these devices are referred to as local devices as they are directly connected to the server). The USB, SATA and IDE controllers 11, 12 and 13 implement the respective control functions for controlling and communicating with these external devices using the respective communication protocols, and also have hub or switch functions for supporting multiple peripheral devices. The bridge 14 connects the USB, SATA and IDE controllers 11, 12 and 13 to other parts of the server 10, such as host controllers (USB host controllers, etc.), CPU, memory, etc. The bridge 14 communicates with these device controllers 11, 12 and 13 using the respective communication protocols (USB, SATA and IDE), and transmits the data to and from the rest of the server for usage.

The remote USB, SATA and IDE access functions of the server 10 are performed by a controller, in this example, the IPMI section 15 (e.g. an IPMI card) of the server. IPMI (Intelligent Platform Management Interface) is a technology that allows the monitoring of server hardware health related factors including CPU temperature, voltage, fan speed, etc. The IPMI specification defines a set of common interfaces to computer hardware and firmware which system administrators can use to monitor system health and manage the system. IPMI operates independently of the server's operating system, and runs on a dedicated controller called the BMC (Baseboard Management Controller) and other satellite controllers. The IPMI system communicates with a remote management console using messages transferred between the BMC and the remote management console over a network such as an Ethernet LAN or other network. In the server 10 shown in FIG. 1A, the remote USB, SATA and IDE access functions are implemented in the IPMI section 15, utilizing the existing BMC and network access of the IPMI.

Figure 1B:
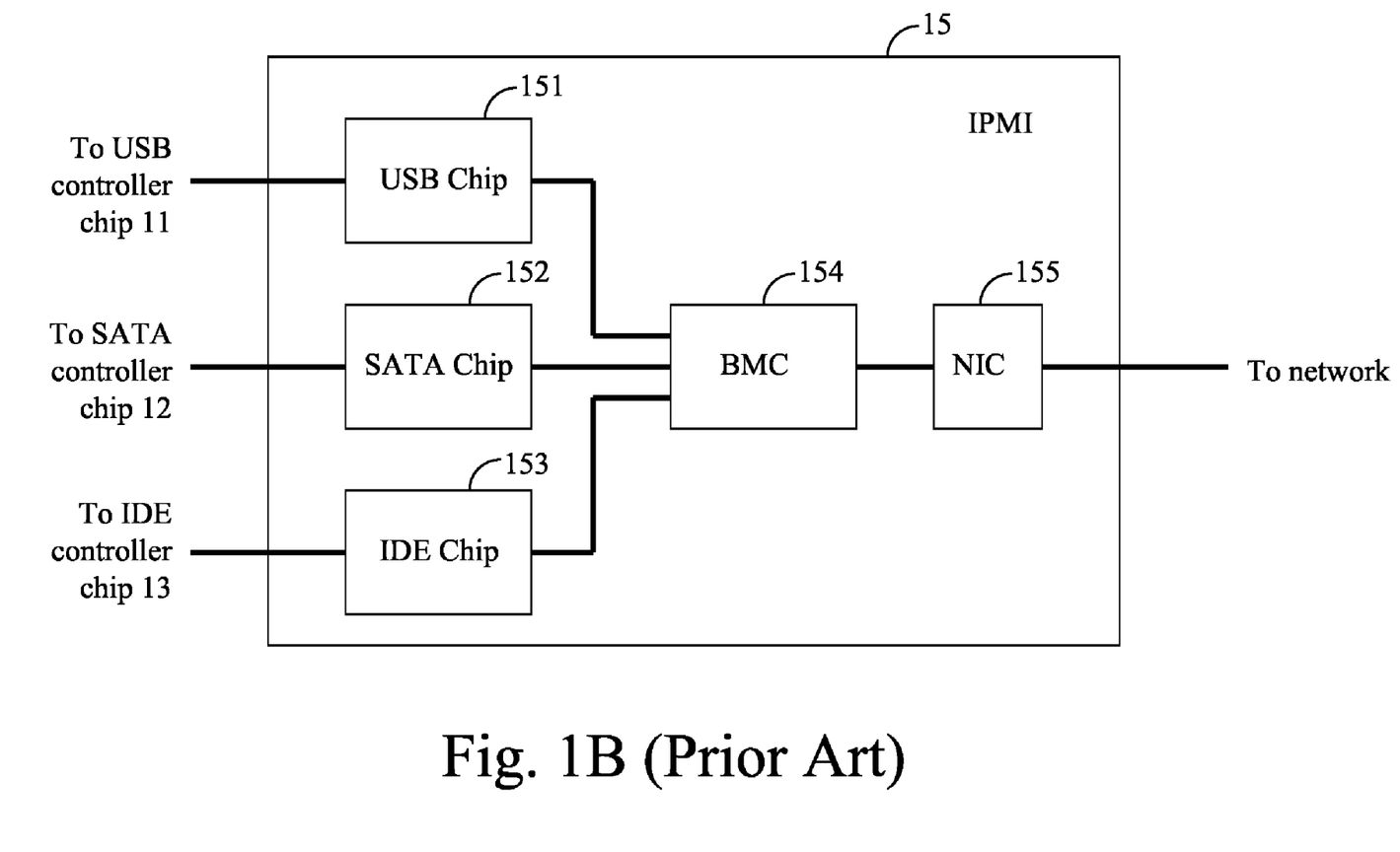
FIG. 1B illustrates the remote device access controller of the server of FIG. 1A.

The structure of the IPMI section 15 is shown in FIG. 1B. It includes a BMC 154 for performing the normal IPMI functions as well as the remote peripheral device access functions, and a NIC (network interface controller, alternatively referred to as network interface circuit, network interface card or network interface chip) 155 for interfacing the BMC 154 with the network. The IPMI section 15 is provided with a USB chip 151, a SATA chip 152, and an IDE chip 153 for interfacing the BMC 154 with the USB, SATA and IDE controllers 11, 12 and 13, respectively. The BMC 154 executes driver functions for the USB, SATA and IDE chips 151, 152 and 153. The BMC 154 packetizes the data from the USB, SATA, and IDE chips 151, 152 and 153, such as by adding network headers, etc., and transmits them to the network via the NIC 155 to be sent to the client. The BMC also un-packetizes the network packets received from the network via the NIC 155 and passes them to the USB chip 151, SATA chip 152, and IDE chip 153. The USB controller 11 (or the SATA controller 12, or the IDE controller 13) acts as a hub or switch for the virtual (remote) USB (or SATA, or IDE) device. Data flows between the remote device on the client and the host controller of the server (USB host controller, SATA host controller, or IDE host controller) via the bridge 14, the USB controller chip 11 (or the SATA controller chip 12, or the IDE controller chip 13), the USB chip 151 (or the DATA chip 152, or the IDE chip 153), the BMC 154, the NIC 155, and the network.

Because the IPMI section 15 needs to communicate with the USB, SATA and IDE controllers 11, 12 and 13, the IPMI section must be provided with the ability to communicate using the respective communication protocols, which is provided by the USB, SATA, and IDE chips 151, 152 and 153 in this example. This complicates the structure of the IPMI section 15.

SUMMARY OF THE INVENTION

The present invention is directed to a server with remote peripheral device access functions that substantially obviates one or more of the problems due to limitations and disadvantages of the related art.

An object of the present invention is to provide a controller with a simpler structure that can perform remote peripheral device access functions for multiple types of remote peripheral devices such as USB, SATA and IDE.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a first computer for accessing a plurality of peripheral devices located on one or more second computers connected to the first computer by a network, the plurality of peripheral devices including at least two types using different communication protocols, where the first computer includes: a controller for communicating data with the one or more second computer over the network, the data including data generated by or to be consumed by the at least two types of peripheral devices located on the one or more second computers; a bridge; and an interface circuit connected to the controller and the bridge, wherein the controller communicates the data with the bridge via the interface circuit using a single predetermined communication protocol. The predetermined communication protocol may be a Peripheral Component Interconnect protocol; the peripheral devices located on one or more second computers may be a USB device, a SATA device or an IDE device.

In another aspect, the present invention provides a method implemented on a first computer for accessing a plurality of peripheral devices located on one or more second computers connected to the first computer by a network, the plurality of peripheral devices including at least two types using different communication protocols, where the method includes: a controller communicating data with the one or more second computer over the network, the data including data generated by or to be consumed by the at least two types of peripheral devices located on the one or more second computers; and the controller communicating the data with a bridge via an interface circuit using a single predetermined communication protocol. The predetermined communication protocol may be a Peripheral Component Interconnect protocol; the peripheral devices located on one or more second computers may be a USB device, a SATA device or an IDE device.

In yet another aspect, the present invention provides a system that includes a first computer and a second computer connected to the first computer by a network, wherein the first computer includes: a controller; a bridge; and an interface circuit connected to the controller and the bridge, wherein the controller communicates with the bridge via the interface circuit using a first communication protocol; wherein the second computer includes: a peripheral device; a peripheral device controller for controlling and communicating with the peripheral device using a second communication protocol different from the first communication protocol; and a processor connected to the peripheral device controller and executing a remote device control application; and wherein data generated by or to be consumed by the peripheral device of the second computer is transmitted between the peripheral device and the peripheral device controller of the second computer using the second communication protocol, transmitted between the processor of the second computer and the controller of the first computer as network packets, and transmitted between the controller and the bridge of the first computer using the first communication protocol.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, detailed illustrative embodiments of the present invention is disclosed herein. However, structures, systems and operations in accordance with the present invention may be embodied in a wide variety of forms and modes, some of which may be quite different from those in the disclosed embodiments. Consequently, the specific structural and functional details disclosed herein are merely representative, yet in that regard, they are deemed to afford the best embodiments for purposes of disclosure and to provide a basis for the claims herein, which define the scope of the present invention. The following presents a detailed description of the preferred embodiment as well as some alternative embodiments of the present invention.

Figure 2A:
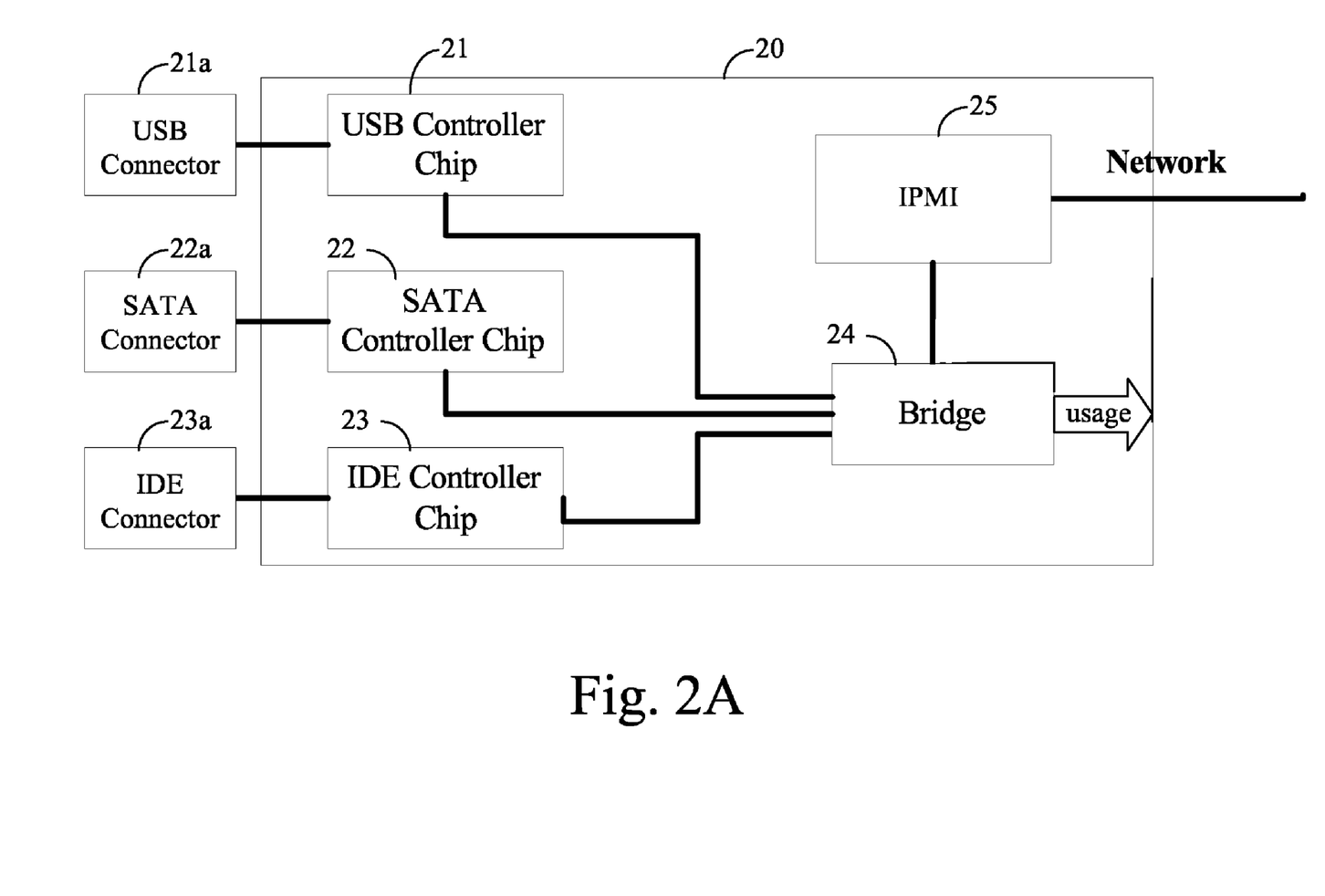
FIG. 2A illustrates a server having remote USB, SATA and IDE access capabilities according to an embodiment of the present invention.

FIG. 2A illustrates a server 20 that provides remote USB, SATA and IDE access capabilities according to an embodiment of the present invention. The server 20 includes a USB controller 21 connected to a USB connector 21a, a SATA controller 22 connected to a SATA connector 22a, an IDE controller 23 connected to an IDE connector 23a, a bridge 24 connected to the USB controller 21, the SATA controller 22 and the IDE controller 23, and a controller (here, the IPMI section of the server) 25 connected to the bridge 24 for performing remote USB, SATA and IDE access functions. The USB, SATA and IDE connectors 21a, 22a and 23a are for receiving external (local) USB, SATA and IDE devices, respectively. The USB, SATA and IDE controllers 21, 22 and 23 implement the respective control functions for controlling and communicating with these external devices using the respective communication protocols. The bridge 24 connects the USB, SATA and IDE controller 21, 22 and 23 to other parts of the server 20, such as host controllers, CPU, memory, etc. The bridge 24 communicates with these device controllers 21, 22 and 23 using the respective communication protocols, and transmits the data to and from the rest of the server for usage. The structures and functions of the USB, SATA and IDE controllers 21, 22 and 23 and the USB, SATA and IDE connectors 21a, 22a and 23a are similar to those of the corresponding components of the conventional server 10 in FIG. 1A. The functions of the bridge 24 with respect to communications with the USB, SATA and IDE controllers 21, 22 and 23 are similar to that of the bridge 14 of the conventional server 10 in FIG. 1A.

In addition to these functions, the bridge 24 operates to convert data in the USB, SATA and IDE format to and from a single data format, such as the PCI (Peripheral Component Interconnect) format, or a suitable LAN data format, etc. PCI is used in the description below as an example, but is not limited thereto. The bridge 24 communicates data with the USB, SATA and IDE host controllers of the server (not shown) using the USB, SATA and IDE protocols, respectively, and communicates data with the IPMI section 25 using the PCI protocol.

Figure 2B:
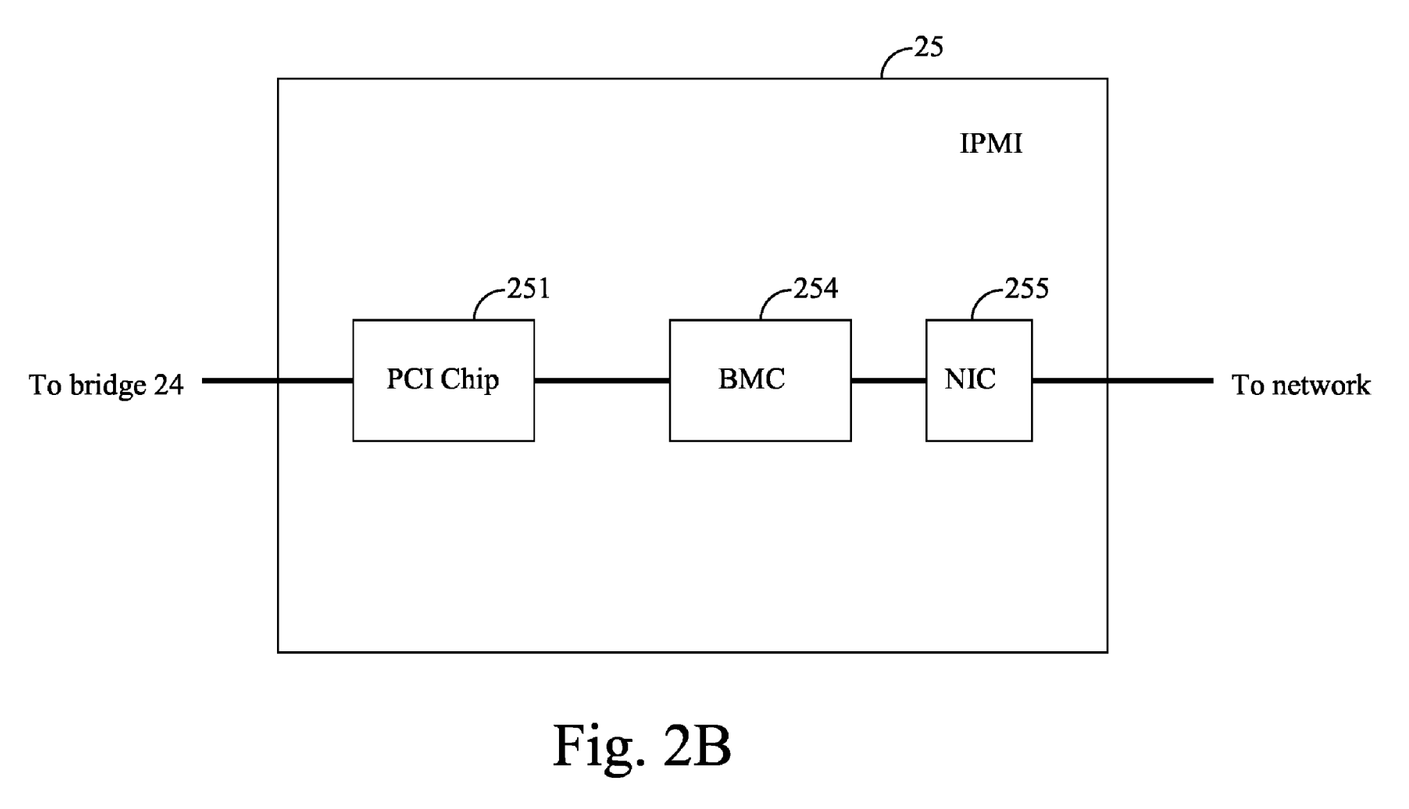
FIG. 2B illustrates the remote device access controller of the server of FIG. 2A.

Unlike the IPMI section 15 of the conventional server 10 shown in FIG. 1A, the IPMI section 25 of the server 20 is connected to the bridge 24, rather than the USB, SATA and IDE controller 21, 22 and 23. The IPMI section 25 communicates data with the bridge 24 using the PCI format. The structure of the IPMI section 25, as shown in FIG. 2B, includes a BMC 254 for performing the normal IPMI functions as well as the remote device access functions, and a NIC 255 for interfacing the BMC 254 with the network. The IPMI section 25 further includes a PCI chip 251 for interfacing the BMC 254 with the bridge 24 using the PCI protocol. The BMC 254 executes a driver function for the PCI chip 251. The BMC 254 packetizes the data from the PCI chip 251, such as by adding network headers, etc., and transmits them to the network via the NIC 255 to be sent to the client. The BMC 254 also un-packetizes the network packets received from the network via the NIC 255 and passes them to the PCI chip 251. Although the underlying data transmitted between the BMC 254 and the PCI chip 251 and between the PCI chip 251 and the bridge 24 are USB, SATA or IDE data, the format of the data is the PCI format. The BMC 254 and the PCI chip 251 do not need to understand the respective USB, SATA and IDE protocols in order to communicate with the bridge 24.

Because the IPMI section 25 only needs to communicate data with the bridge 24 using the PCI protocol, the multiple chips in the IPMI section 15 of FIG. 1B (the USB, SATA, and IDE chips 151, 152 and 153) can be replaced by a single PCI chip 251. This simplifies the structure of the IPMI section 25. Further, the bridge 14 in the conventional server configuration (FIG. 1A) already has the structures (hardware and firmware) to communicate data using the USB, SATA, and IDE protocols, and likely also already has the structures to communicate data using the PCI protocol with other peripherals of the server. Thus, the structure of the bridge 24 is not significantly more complicated than the structure of the bridge 14 due to the addition of the data format conversion functions. In fact, the hardware of the bridge 24 may remain the same as the conventional bridge 14, and only the firmware of the bridge needs to be modified for the embodiment of FIG. 2A.

In the conventional server configuration (FIG. 1A), the IPMI section 15 takes up a port of the USB controller 11. In the server configuration according to embodiments of the present invention (FIG. 2A), the IPMI section 25 does not take up a port of the USB controller 21, although it takes up a port of the bridge 24.

In the server structure shown in FIG. 2A, the USB controller 21, SATA controller 22 and IDE controller 23 perform the control functions for the local USB, SATA and IDE devices physically located on the server 20. These controllers are not necessary for the remote USB, SATA and IDE access functions of the server 20, and can therefore be omitted if the local devices are not present.

Figure 3:
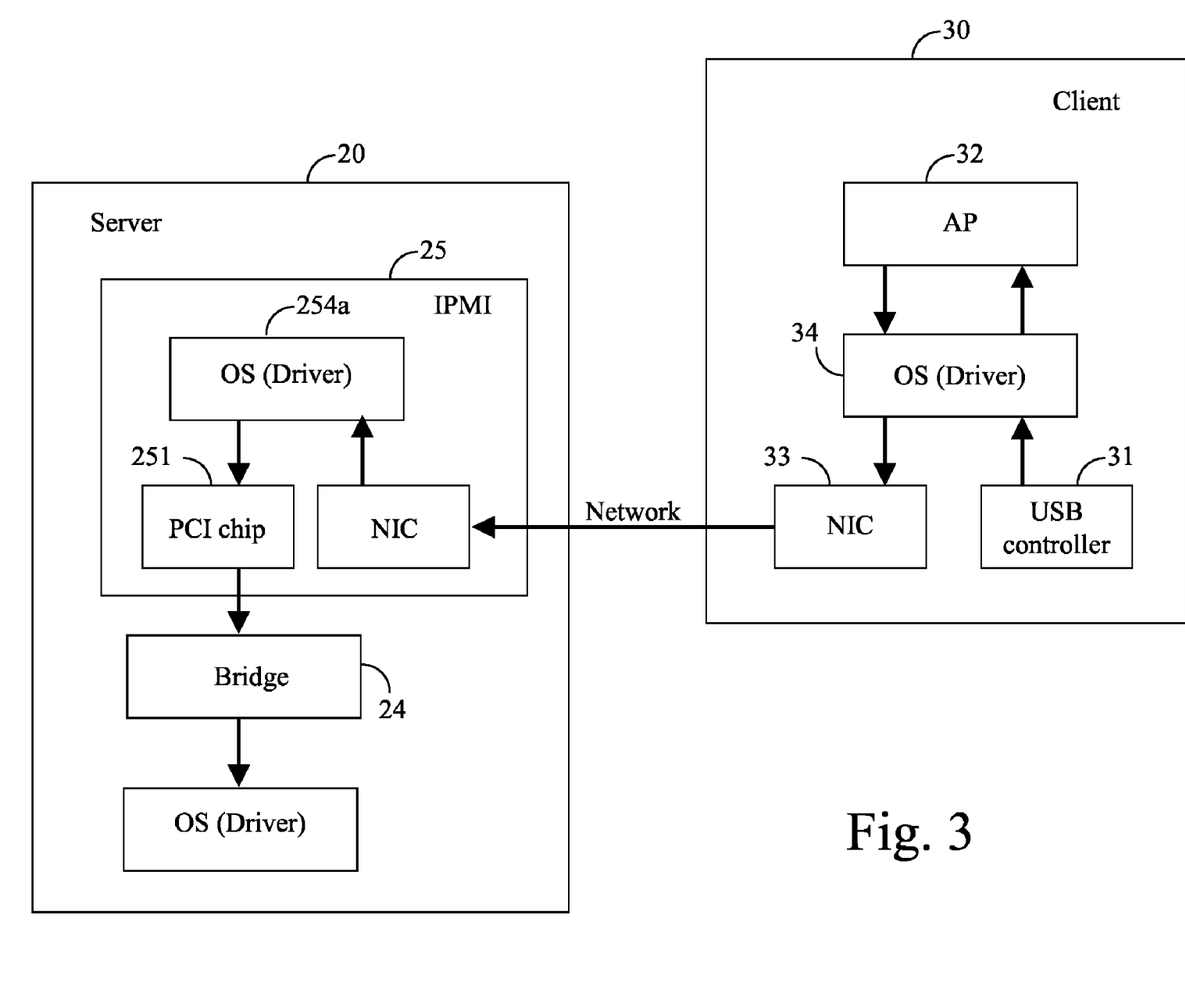
FIG. 3 illustrates a client and a server connected by a network where embodiments of the present invention are implemented.

To achieve remote access of a USB, SATA or IDE device located on a client (the remote host), the client is provided with software (or firmware) to cooperate with the server 20 for data communication. FIG. 3 illustrates relevant hardware and software components of a client 30 and the server 20 connected to each other via a network. The network may be any suitable network, such as a local area network (LAN), wide are network (WAN), the Internet, Intranet, Ethernet, wireless network, etc. In this example, the client 30 has a USB controller 31 for controlling a USB device (not shown); the cases of SATA and IDE devices are similar and can be understood from the description of the USB example. Also, the arrows in FIG. 3 illustrate the data flow (of data generated by the remote USB device) from the remote USB device on the client 30 to the server 20; the reverse data flow (of data to be consumed by the remote USB device) can be similarly understood but not shown in FIG. 3 to avoid overcrowding. A remote USB control application 32 executed by a processor of the client 30 implements the remote USB access function, and interacts with the USB controller 31 and a NIC 33 of the client via the operating system (device drivers) 34 of the client. The data is transmitted between the remote USB control application 32 on the client 30 and the IPMI section 25 of the server 20 using a network protocol, and the data may be in any format agreed upon by the application 32 and the IPMI section 25. In a first implementation, the application 32 on the client 30 processes data received from the USB controller 31 by extracting the "pure" user data and discarding the headers and other information pertaining to the data format, and transmits the user data to the server 20 as network packets having a predetermined packet format. The BMC 254 on the server 20 (represented here by the software component 254a of the BMC) re-packetizes the user data received from the client 30 into the PCI format and transmits it to the bridge 24 via the PCI chip 251. In this first implementation, the data transmitted between the client 30 and the BMC 254 have the same packet format regardless of the type of the peripheral devices and device controllers (USB, SATA or IDE) on the client 30. In a second implementation, the application 32 on the client 30 does not change the format of the data it receives from the USB controller 31, so the data transmitted over the network is in the USB format. The BMC 254 on the server 20 extracts the user data from the data it receives (in the USB format), re-packetizes it into the PCI format and transmits it to the bridge 24 via the PCI chip 251. In these ways, the remote USB control application 32 on the client 30 and the BMC 254 on the server 20 cooperate with each other to achieve PCI data emulation for the bridge 24.

The server configuration according to embodiments of the present invention shown in FIGS. 2A and 2B has many advantages. For example, it reduces time to market of the server products when additional remote device access functions are to be added. With the conventional configuration shown in FIGS. 1A and 1B, if a remote access function for another type of peripheral device is to be added (e.g. if the server originally has only remote USB access functions, and a remote SATA access function is to be added), the hardware of the IPMI section 15 needs to be changed to add a SATA chip 152. With the configuration shown in FIGS. 2A and 2B, the hardware of the IPMI section 25 does not need to be changed to add a new remote device access function. If the application 32 on the server 30 and the BMC 254 transmits pure user data between each other (as in the first implementation described above), then the firmware of the BMC 254 does not need to be changed to achieve remote access of a new type of peripheral device. If the data transmitted between the application 32 on the server 30 and the BMC 254 is specific to the type of remote device rather than pure user data (as in the second implementation described above), then the firmware of the BMC 254 needs to be changed but no hardware change would be required. Of course, an appropriate application 32 is required on the client 30 to cooperate with the server to accomplish remote device access. In addition to reduced time to market, the structure of FIGS. 2A and 2B increases feature flexibility.

Further, the server structure shown in FIG. 2A reduces layout difficulty as the number of connections between components are reduced. The structure of the IPMI section 25 itself is also simpler, which reduces chip cost. At the same time, the firmware complexity of the BMC 254 is reduced as it no longer needs to communicate with multiple different types of controllers using different communication protocols. Moreover, as pointed out earlier, the USB controller 21, the SATA controller 22 and the IDE controller 23 are not necessary for the remote device access functions, and may be omitted if they are not needed to control local devices, thereby further reducing chip cost. The server structure shown in FIG. 2A also reduces port count for the USB, SATA and IDE controllers 21, 21 and 23, because the IPMI section 25 does not take up a port on these controllers.

In the above-described embodiments, USB, SATA and IDE are used as examples of peripheral devices for which remote device access is provided. Of course, remote access for other types of peripheral devices that use other communication protocols can be similarly implemented. A benefit of the present invention is the ability to provide remote access for multiple types of peripheral devices with a simplified remote access controller structure on the server.

In the above-described embodiments, the remote device access functions are implemented in an IPMI section of the server as an example. These functions can be implemented by other parts of the server, including a dedicated remote access controller for remote access. In one particular example, the server is a network-enabled KVM (keyboard-video-mouse) switch device. A KVM switch is a device that allows one or more user consoles to selectively communicate with one or more computers connected to the KVM switch. In a conventional KVM switch configuration, one or more consoles (each including a keyboard and/or mouse and a display device) are connected to the KVM switch by cables, and a plurality of computers are connected to the KVM switch by cables. A network-enabled KVM switch (sometimes referred to as a network-based or IP-based KVM switch or an iKVM switch, and the technology is sometimes referred to KVM over IP) uses a network protocol (e.g. TCP/IP) as its communication protocol, and can be accessed from any computer on a network (such as a WAN, LAN, the Internet, Intranet, Ethernet, wireless network, etc.) A remote operator can log in to an iKVM switch from anywhere on the network via a browser, and can exchange keyboard, video and mouse signals with any one of the computers connected to the iKVM switch. An iKVM switch has a controller, referred to as an iKVM controller, which is connected between a NIC and the CPU of the server, for handling packets containing keyboard and mouse signals received from a remote console on a network, and transmits packets containing video signals and other signals to the network via the NIC. In such an iKVM switch device, the remote peripheral device access functions performed by the BMC 254 in the above-described embodiment can be implemented in the iKVM controller.

The embodiments of the invention are described above in a server-client environment, but the invention can apply to any computer system where a first computer (a local host) is capable of accessing a peripheral device physically located on a second computer (a remote host) which is connected to the first computer by a network. The network may be any suitable network, such as a local area network (LAN), wide are network (WAN), the Internet, etc.

It will be apparent to those skilled in the art that various modification and variations can be made in the server structure of the present invention without departing from the spirit or scope of the invention. Thus, it is intended that the present invention cover modifications and variations that come within the scope of the appended claims and their equivalents.

What is claimed is:

1. A first computer for accessing a plurality of peripheral devices located on one or more second computers connected to the first computer by a network, the plurality of peripheral devices including at least two types using different communication protocols, the first computer comprising:
   a baseboard management controller (BMC) for communicating data with the one or more second computers over the network, the data including data generated by or to be consumed by the at least two types of peripheral devices located on the one or more second computers;
   a bridge; and
   an interface circuit connected between the BMC and the bridge, wherein the BMC communicates the data with the bridge via the interface circuit using a single predetermined communication protocol, wherein the predetermined communication protocol is a Peripheral Component Interconnect protocol.

2. The first computer of claim 1, wherein each of the peripheral devices located on the one or more second computers is a Universal Serial Bus (USB) device, a Serial Advanced Technology Attachment (SATA) device or an Integrated Drive Electronics (IDE) device using a respective communication protocol.

3. The first computer of claim 1, further comprising a network interface controller (NIC) for connecting to the network, wherein the BMC is connected to the NIC, and wherein the BMC packetizes the data from the interface circuit and transmits the packetized data to the network via the NIC, and un-packetizes the data received from the network via the NIC and transmits the un-packetized data to the interface circuit.

4. The first computer of claim 1, wherein the BMC further performs Intelligent Platform Management Interface functions.

5. The first computer of claim 1, wherein the BMC further communicates keyboard, video and mouse data over the network via the NIC.

6. The first computer of claim 1, further comprising one or more of a Universal Serial Bus (USB) device controller, a Serial Advanced Technology Attachment (SATA) device controller, and an Integrated Drive Electronics (IDE) device controller connected to the bridge, for respectively controlling one or more of a USB device, a SATA device and a IDE device connected to the first computer.

7. The first computer of claim 2, wherein the bridge converts data between the predetermined communication protocol and the communication protocols used by the peripheral devices.

8. A method implemented on a first computer for accessing a plurality of peripheral devices located on one or more second computers connected to the first computer by a network, the plurality of peripheral devices including at least two types using different communication protocols, the method comprising:
   a baseboard management controller (BMC) communicating data with the one or more second computers over the network, the data including data generated by or to be consumed by the at least two types of peripheral devices located on the one or more second computers; and
   the BMC communicating the data with a bridge via an interface circuit connected between the BMC and the bridge using a single predetermined communication protocol, wherein the predetermined communication protocol is a Peripheral Component Interconnect protocol.

9. The method of claim 8, wherein each of the peripheral devices located on one or more second computers is a Universal Serial Bus (USB) device, a Serial Advanced Technology Attachment (SATA) device or an Integrated Drive Electronics (IDE) device using a respective communication protocol.

10. The method of claim 8, further comprising:
    the BMC packetizing the data from the interface circuit and transmitting the packetized data to the network via a network interface controller (NIC), and un-packetizing the data received from the NIC and transmitting the un-packetized data to the interface circuit.

11. The method of claim 9, further comprising:
    the bridge converting data between the predetermined communication protocol and the communication protocols used by the peripheral devices.

12. A system comprising:
    a first computer; and
    at least one second computer connected to the first computer by a network,
    wherein the first computer comprises:
      a baseboard management controller (BMC);
      a bridge; and an interface circuit connected between the BMC and the bridge, wherein the BMC communicates with the bridge via the interface circuit using a first communication protocol;

wherein the at least one second computer comprises:
a peripheral device;
a peripheral device controller for controlling and communicating with the peripheral device using a second communication protocol different from the first communication protocol; and
a processor connected to the peripheral device controller and executing a remote device control application; and wherein data generated by or to be consumed by the peripheral device of the at least one second computer is transmitted between the peripheral device and the peripheral device controller of the second computer using the second communication protocol, transmitted between the processor of the second computer and the BMC of the first computer as network packets, and transmitted between the BMC and the bridge of the first computer using the first communication protocol, wherein the first communication protocol is a Peripheral Component Interconnect protocol.

13. The system of claim 12, wherein the processor of the at least one second computer receives the data from the peripheral device controller, extracts user data by discarding headers and format information, and transmits the user data to the first computer as the network packets, and
wherein the BMC of the first computer receives the network packets and re-packetizes the user data into a format according to the first communication protocol for transmission to the bridge.

14. The system of claim 12, wherein the processor of the at least one second computer receives the data from the peripheral device controller and transmits the received data to the first computer as the network packets, and
wherein the BMC of the first computer receives the network packets, extracts user data from the packets by discarding headers and format information, and re-packetizes the user data into a format according to the first communication protocol for transmission to the bridge.

15. The system of claim 12, wherein the second communication protocol is a Universal Serial Bus (USB) protocol, a Serial Advanced Technology Attachment (SATA) protocol or an Integrated Drive Electronics (IDE) protocol.

16. The system of claim 12, wherein the network includes a local area network (LAN), a wide are network (WAN), Internet, intranet, Ethernet, or a wireless network.

* * * * *